US012775572B2

(12) United States Patent
Ensey et al.

(10) Patent No.: US 12,775,572 B2
(45) Date of Patent: Oct. 27, 2026

(54) REMOTE MEMORY ACCESS SYSTEMS AND METHODS

(71) Applicant: Aligned.co, San Juan, PR (US)

(72) Inventors: Christopher Martin Ensey, San Juan, PR (US); David Andrew Stanfill, North Canton, OH (US); David Paul Reynolds, Cicero, NY (US); James Ryan Holodnak, North Canton, OH (US); Daniel Meszaros, Baja (HU)

(73) Assignee: Aligned.co, San Juan, PR (US)

( * ) Notice: Subject to any disclaimer, the term of this patent is extended or adjusted under 35 U.S.C. 154(b) by 22 days.

(21) Appl. No.: 19/078,877

(22) Filed: Mar. 13, 2025

(65) Prior Publication Data

US 2025/0291760 A1 Sep. 18, 2025

Related U.S. Application Data

(60) Provisional application No. 63/564,854, filed on Mar. 13, 2024.

(51) Int. Cl.
*G06F 13/40* (2006.01)
*G06F 13/28* (2006.01)
*G06F 15/173* (2006.01)

(52) U.S. Cl.
CPC .... *G06F 13/4068* (2013.01); *G06F 15/17331* (2013.01)

(58) Field of Classification Search
CPC .......................... G06F 13/28; G06F 15/17331
See application file for complete search history.

(56) References Cited

U.S. PATENT DOCUMENTS

| | | | | |
|---|---|---|---|---|
| 2017/0286363 | A1* | 10/2017 | Joshua | G06F 13/28 |
| 2019/0310964 | A1* | 10/2019 | Zhang | G06F 15/17331 |
| 2019/0372914 | A1* | 12/2019 | Ganguli | G06F 30/34 |
| 2020/0073849 | A1* | 3/2020 | Dormitzer | G06F 13/28 |
| 2020/0136943 | A1* | 4/2020 | Banyai | G06F 11/3006 |
| 2020/0314181 | A1* | 10/2020 | Eran | H04L 67/10 |
| 2022/0337532 | A1* | 10/2022 | Tanaka | H04L 49/9063 |
| 2024/0176898 | A1* | 5/2024 | Hale | G06F 21/602 |

* cited by examiner

*Primary Examiner* — Getente A Yimer
(74) *Attorney, Agent, or Firm* — ASHURST PERKINS COIE US LLP

(57) ABSTRACT

The present disclosure relates to systems and methods remote memory access between systems. In particular, some implementations relate to remote memory access using data processing units that can reduce loads on central processing units or other system components. Some implementations utilize scheduling algorithms to optimize memory transfers. Some implementations relate to data processing unit hardware that includes programmable logic, which can be configured for scheduling, data processing, and the like.

20 Claims, 6 Drawing Sheets

REMOTE MEMORY ACCESS SYSTEMS AND METHODS

BACKGROUND

The approaches described in this section are approaches that could be pursued, but not necessarily approaches that have been previously conceived or pursued. Thus, unless otherwise indicated, it should not be assumed that any of the material described in this section qualifies as prior art merely by virtue of its inclusion in this section.

Remote memory access, e.g., remote direct memory access (RDMA) can allow direct memory access between computer systems without the involvement of an operating system running on the computer systems. RDMA approaches can reduce latency in transfers because, for example, little or no work is required by central processing units (CPUs), caches, context switches, and so forth. Additionally, memory transfer operations can continue in parallel with other system operations.

However, there are limitations with current approaches to remote direct memory access. Accordingly, there is a need for improved systems, methods, and devices for improved remote direct memory access.

SUMMARY

For purposes of this summary, certain aspects, advantages, and novel features are described herein. It is to be understood that not all such advantages necessarily may be achieved in accordance with any particular implementation. Thus, for example, those skilled in the art will recognize that implementations can achieve one advantage or group of advantages as taught herein without necessarily achieving other advantages as may be taught or suggested herein.

In some embodiments, the techniques described herein relate to a system including: a network switch; a first computing system including: a first central processing unit (CPU); a first accelerator unit (AU) including a first AU memory; a first data processing unit (DPU) including: a first network interface configured to be communicatively coupled to the network switch; and a first programmable processing unit, wherein the first DPU is configured to present a first virtual endpoint configured for first sideband communication with at least one of the first CPU or the first AU, and wherein the first programmable processing unit is configured to generate a first forecast indicating availability of the first AU within a first forward window; and a first main board for receiving the first CPU, the first AU, and the first DPU, the first main board including a first bus interface configured to communicatively couple to the first AU and the first DPU; a second computing system including: a second CPU; a second AU including a second AU memory; and a second DPU including: a second network interface configured to be communicatively coupled to the network switch; and a second programmable processing unit, wherein the second DPU is configured to present a second virtual endpoint configured for second sideband communication with at least one of the second CPU or the second AU, and wherein the second programmable processing unit is configured to generate a second forecast indicating availability of second AU within a second forward window; and a second main board for receiving the second CPU, the second AU, and the second DPU, the second main board including a second bus interface configured to communicatively couple to the second AU and the second DPU, wherein the first DPU is configured to make the first forecast available via the first network interface to the second computing system, and wherein the second DPU is configured to make the second forecast available via the second network interface to the first computing system, wherein the first DPU and the second DPU are configured for transferring data between the first AU memory and the second AU memory.

In some embodiments, the techniques described herein relate to a system, wherein the first forecast is determined by: accessing a set of instructions in an AU pipeline via the sideband, the set of instructions indicating operations to be executed by the first AU.

In some embodiments, the techniques described herein relate to a system, wherein the first forecast is further determined by: determining a memory access pattern of the first AU, wherein the memory access pattern includes one or more of: a sequential access pattern, a strided access pattern, or a temporally repeating access pattern.

In some embodiments, the techniques described herein relate to a system, wherein the first virtual endpoint is provided using PCIe Single Root I/O virtualization.

In some embodiments, the techniques described herein relate to a system, wherein the second DPU is configured to, in response to receiving a request from the first computing system for data stored in a memory of the second AU: access one or more local memory addresses of the second AU memory; and transmit a content of the one or more local memory addresses of the second AU memory to the first DPU via the second network interface.

In some embodiments, the techniques described herein relate to a system, wherein the second DPU is configured to compress the content prior to transmitting the content to the first DPU.

In some embodiments, the techniques described herein relate to a system, wherein the request includes one or more addresses in a global address space, the global address space including a mapping of the first AU memory and the second AU memory, wherein accessing the one or more local memory addresses of the second AU memory includes: determining, using the one or more addresses in the global address space and a mapping of the global address space to a local address space of the second AU memory, the one or more local memory addresses.

In some embodiments, the techniques described herein relate to a system, wherein the request is generated by the first DPU at least in part based on a determination of availability of the second AU by the first DPU based on the second forecast.

In some embodiments, the techniques described herein relate to a system, wherein the first AU is a first graphics processing unit (GPU) and the second AU is a second GPU.

In some embodiments, the techniques described herein relate to a system, wherein the first network interface is a first ethernet interface and the second network interface is a second ethernet interface.

In some embodiments, the techniques described herein relate to a system, wherein the first programmable processing unit includes a first field programmable gate array (FPGA) and the second programmable processing unit includes a second FPGA.

In some embodiments, the techniques described herein relate to a system, wherein the first bus interface is a first PCI express (PCIe) interface and the second bus interface is a second PCIe interface, and wherein the first DPU and the first AU are connected to a first PCI switch.

In some embodiments, the techniques described herein relate to a method for remote direct memory access in a cluster of systems including a plurality of accelerator units (AUs) and a plurality of data processing units (DPUs), wherein each DPU of the plurality of DPUs is associated with an AU of the plurality of AUs, the method including: accessing, by a requesting data processing unit (DPU) of the plurality of DPUs associated with a requesting AU of the plurality of AUs, a plurality of forecasts, each forecast of the plurality of forecasts corresponding an AU of the plurality of AUs, wherein each DPU of the plurality of DPUs is configured to generate a forecast for its associated AU; determining, by the requesting DPU using at least a subset of the plurality of forecasts, a target AU selected from the plurality of AUs; generating, by the requesting DPU, a request for data stored in a memory of the target AU; transmitting, by the requesting DPU, the request to a target DPU associated with the target AU; receiving, by the requesting DPU from the target DPU, the data; and causing writing of the data to a memory of the requesting AU.

In some embodiments, the techniques described herein relate to a method, wherein the plurality of forecasts is generated by, for each DPU and its associated AU: accessing, by the DPU, a set of instructions in an AU pipeline of the associated AU, the set of instructions indicating operations to be executed by the associated AU.

In some embodiments, the techniques described herein relate to a method, wherein each forecast of the plurality of forecasts is further determined by, for each DPU and its associated AU: determining, by the DPU, a memory access pattern of the associated AU, wherein the memory access pattern includes one or more of: a sequential access pattern, a strided access pattern, or a temporally repeating access pattern.

In some embodiments, the techniques described herein relate to a method, wherein the target DPU is configured to compress the data prior to transmitting the data to the requesting DPU, the method further including, prior to causing writing of the data to the memory of the requesting AU: decompressing, by the requesting DPU, the compressed data.

In some embodiments, the techniques described herein relate to a method, wherein the target DPU is configured to, in response to receiving the request from the requesting DPU for data stored in a memory of the target AU: access one or more local memory addresses of the target AU memory; and transmit a content of the one or more local memory addresses of the target AU memory to the requesting DPU via a network interface of the target DPU.

In some embodiments, the techniques described herein relate to a method, wherein the request includes one or more addresses in a global address space, the global address space including a mapping of memory in each AU of the plurality of AUs, wherein accessing one or more memory addresses of the target AU memory includes: determining, using the one or more addresses in the global address space and a mapping of the global address space to a local address space of the target AU, the one or more local memory addresses.

In some embodiments, the techniques described herein relate to a method, wherein each programmable processing unit of the plurality of DPUs includes a field programmable gate array.

In some embodiments, the techniques described herein relate to a method wherein each DPU and its associated AU are connected to each other via a same PCI express (PCIe) switch.

BRIEF DESCRIPTION OF THE DRAWINGS

The technologies described herein will become more apparent to those skilled in the art by studying the Detailed Description in conjunction with the drawings. Embodiments or implementations describing aspects of the present technologies are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Figure 1:
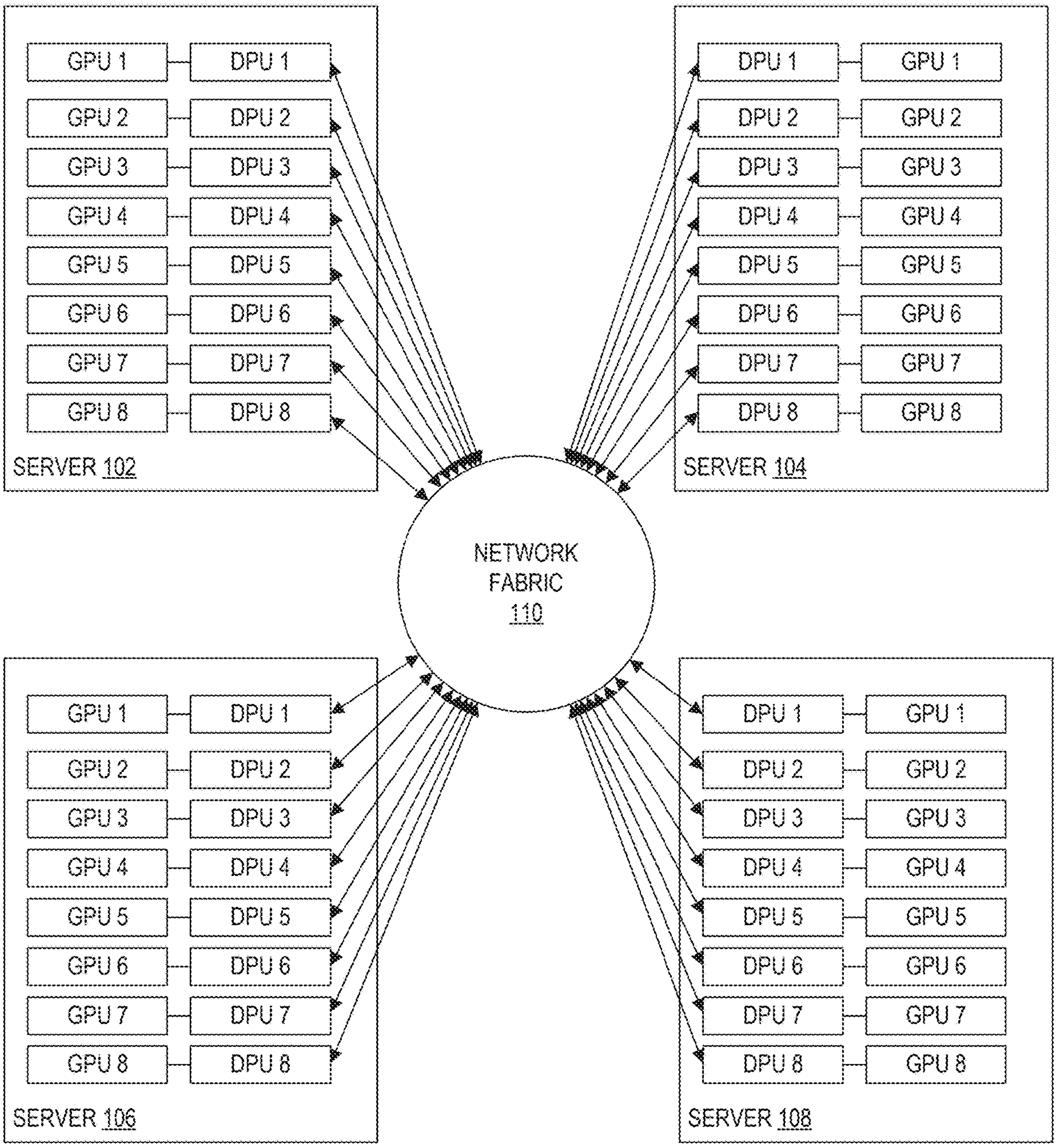
FIG. 1 is a diagram that schematically illustrates the use of data processing units (DPUs) to enable GPU memory access across multiple GPUs and multiple servers on a network.

Although several implementations, examples, and illustrations are disclosed below, it will be understood by those of ordinary skill in the art that the technologies described herein extend beyond the specifically disclosed implementations, examples, and illustrations and include other uses of the technologies and obvious modifications and equivalents thereof. Implementations of the technologies are described with reference to the accompanying figures, wherein like numerals refer to like elements throughout. The terminology used in the description presented herein is not intended to be interpreted in any limited or restrictive manner simply because it is being used in conjunction with a detailed description of certain specific implementations. In addition, implementations can include several novel features, and no single feature is solely responsible for its desirable attributes or is essential to practicing the technologies herein described.

Remote direct memory access (RDMA) is a technology that enables direct transfer between the memory of a first computer and a second computer, without involvement of the processors of the first and second computer or with limited CPU involvement, which can reduce latency, reduce CPU overhead, and so forth. RDMA also avoids operating system involvement, which can result in significant performance improvements.

RDMA over Converged Ethernet (RoCE) is a protocol that enables RDMA over ethernet networks. RoCE encapsulates RDMA messages within ethernet frames. For example, RoCE can encapsulate InfiniBand transport packets. There are multiple versions of ROCE. ROCE version 1 is a link layer protocol that allows communication between any two hosts in the same broadcast domain. RoCE version 2 is an internet layer protocol that allows packets to be routed.

RoCE can be particularly beneficial in scenarios where low latency and high bandwidth are important, such as in high performance computing (HPC), big data analytics, real-time data processing, and so forth. Data transfer tasks can be offloaded from the CPU to network hardware (e.g., network adapters or data processing units (DPUs)), thereby freeing up computing resources for other tasks.

While ROCE offers many benefits, RoCE has several limitations that can in reduced performance. For example, when ROCE is used, there can still be problems with congestion management, scheduling, timing, and so forth. In some implementations, the approaches described herein can follow ROCE protocol standards while still providing certain benefits. However, in some cases, there can be deviations from and/or additions to the ROCE protocol. As an example, RoCE version 2 expects operations to be completed in order. However, in some implementations as described herein, such an expectation may not exist. For example, each GPU in a cluster may be operating in a deterministic manner, but the orchestration between GPUs may not be. That is, operations can be performed out of order, which can improve overall performance. Performing operations out of order can be advantageous for certain types of workloads, such as workloads that involve operations or sets of operations that can be carried out independently of one another, thus enabling the order of operations or sets of operations to be rearranged arbitrarily without affecting the final result. As an example, instead of running all operations serially on one graphics processing unit (GPU), a scheduler can select multiple GPUs based on the available GPUs, the divisibility of the operations (e.g. operations or sets of operations that do not depend on other operations or sets of operations), demands for particular operations or sets of operations, etc. For example, some GPUs might have more memory available, which makes them more suitable for certain operations that involve large amounts of data, while another GPU may have less memory but faster processing capabilities, making it more suitable when complex processing of relatively smaller amounts of data is needed. Flexibility in scheduling can lead to significant performance improvements by improving resource utilization across a cluster.

Reference to graphics processing units (GPUs) is made throughout this disclosure. While GPUs represent one common type of hardware with which the systems and methods of the present disclosure can be used, the systems and methods herein are not limited to use with GPUs. The systems and methods herein can be used, additionally or alternatively, with other computing components such as neural processing units (NPUs) or other hardware accelerators. Hardware accelerators can include a field programmable gate array (FPGA), application-specific integrated circuit (ASIC), digital signal processor (DSP), cryptographic accelerator, etc. These and other hardware accelerators are generally referred to as hardware accelerators or accelerator units (AUs) herein. Additionally, while reference is made through this description for PCI Express (PCIe), it will be appreciated that the techniques herein are not necessarily limited to use in systems that use PCIe and can be readily adapted to other expansion busses whether now existing or after-developed, provided that such other expansion busses provide functionality necessary for the use of the technologies herein described. That is, in general, the technologies described herein are not necessarily specific to any particular type of computer hardware but can be applied more generally to various types of computer hardware.

Graphics processing units (GPUs) are increasingly used to perform certain computing tasks, such as machine learning model training, which can benefit from higher core counts and/or greater performance for certain types of calculations. However, to utilize GPUs more closely to their fullest potential, it is important to ensure that GPUs have sufficient data to process to keep them busy rather than idle. Conventionally, data transfers involving GPU memory have involved intermediate copies between GPU memory and system memory, which can add latency and consume CPU resources. Some GPUs can consume data much faster than CPUs. Involving CPUs and system memory in data transfers can present significant bottlenecks. Effectively utilizing RDMA for GPUs can involve special considerations to ensure that memory transfer latency is low enough and bandwidth is high enough that GPUs are not underutilized and idle while waiting for data to become available for processing.

In some implementations, DPUs are used to facilitate direct memory transfers between GPUs. A DPU can be implemented on a PCIe card. A DPU can be located next to a corresponding GPU in a computing system (e.g., a server). In some implementations, the GPU is inserted in a PCIe slot of a main board that is on the same PCIe switch as a corresponding GPU. This can reduce latency and/or increase throughput between the DPU and GPU, as there may not be a need to communicate with components connected to a different PCIe switch or that otherwise involve more complex or slower access methods.

A DPU can include a network interface (e.g., a 400 Gb or 800 Gb ethernet interface, an InfiniBand interface, or any other suitable communications interface). In some implementations, the DPU includes a field programmable gate array (FPGA) or other suitable integrated circuit, such as an ASIC. An FPGA can have certain advantages, as an FPGA can be programmed in a manner that optimizes specific types of work and can be reprogrammed for different types of work. In some implementations, the FPGA is responsible for running a scheduling algorithm for facilitating data transfers between GPUs. The FPGA can be dynamically configured and/or can be configured or reconfigured based on the particular task being executed. For example, different scheduling algorithms may be better suited to different tasks, such as different machine learning tasks, for example based upon the amount of data that needs to be transferred between GPUs, execution times, batch sizes, kernel executions, and so forth.

As described herein, scheduling is a significant concern to ensure that data is available when GPUs need it. Scheduling algorithms can help to Scheduling algorithms can be tailored to the specific problem being solved or task being performed, which can improve data transfer efficiency in some cases. For example, if a working dataset must be distributed across two GPUs because the working dataset cannot fit into the memory of a single GPU, but both GPUs will need access to the full working dataset (or more than can be fit into the memory of a single GPU), ensuring the two GPUs are on the same PCIe switch (e.g., one hop away) or can reduce or minimize latency as compared with a configuration in which the GPUs are on different PCIe switches or installed in different servers. If there is a task that requires a working dataset to be distributed across GPUs, setting up such a task to run on adjacent GPUs (e.g., one-hop away or on the same PCIe switch) can provide improved performance as compared with, for example, randomly selecting an available GPU or selecting the next available GPU in a list. This concept can be extended to any number of GPUs, with it generally being preferable to favor more efficient transfers (e.g., on the same PCIe switch or within the same server) over less efficient transfers, although it will be appreciated that in some cases, it may be preferable to distribute a workload across GPUs where memory transfers will be less efficient, for example because only one GPU on a PCIe switch is available, or because there are other efficiency gains that can be realized, such as running operations on a faster GPU.

FPGAs can have varying numbers of gates, logic blocks, and so forth. An FPGA can have excess compute capacity (e.g., unused gates, logic blocks, etc.) that can be used for tasks other than scheduling, passing through data, and the like. For example, a portion of the FPGA can be dedicated to executing a scheduling algorithm, while other parts of the FPGA can be used to perform data processing such as compression and/or decompression operations. For example, in some implementations, the FPGA performs data transformations during the data flow through the DPU. In some implementations, the DPU can be used for zero-knowledge proof operations. For example, in the context of machine learning, zero-knowledge proof can be used to verify that computations were performed using a particular model, carried out within certain safety parameters, and so forth. By shifting certain data processing tasks to the FPGA on the DPU, loads for such tasks can be lessened or even eliminated from a GPU or CPU. Furthermore, since FPGAs are fully programmable logic, there is no inherent limit to what can be done with the excess processing capacity (e.g., capacity not used for scheduling operations, data transfer operations, etc.) of the FPGA.

In general, it can be desirable to match the processing tasks performed on the FPGA to the available capacity of the FPGA. For example, the FPGA can compress and decompress data as part of a transmission or reception process, which can enable faster data transfers, lessen congestion on a network, and so forth. The compression and decompression of data can be transparent to the GPUs and/or CPUs, improving overall system performance without additional burden on the primary processing units (e.g., GPUs or other accelerators). It will be appreciated that the tasks that are appropriate for the FPGA can depend upon the specific FPGA used, the complexity of a scheduling algorithm being used, and so forth. For example, there may be less available capacity if a smaller or less capable FPGA is used and/or if a relatively complex scheduling algorithm is used. If tasks that are performed on the FPGA are too intensive to be run in a transparent or nearly transparent manner on the FPGA, overall performance can slow as GPUs wait for the FPGA to finish certain processing operations before making information available to the GPUs. In some implementations, the FPGA can be responsible for implementing RDMA and/or ROCE functionality such as error correction, encryption/decryption, and so forth, which can free up other resources to execute other tasks.

As described herein, it can be important to ensure GPUs are not starved for data. Such data may be stored in memory on other GPUs, which may be in the same computing system (e.g., the same server) or different computing systems. Certain data may be resident in the memory of multiple GPUs in a cluster. However, other GPUs may be occupied with memory operations, processing tasks, and so forth, and thus performance on other GPUs can be impacted if remote memory access requests are performed without consideration of the activities taking place on other GPUs, or responses to requests may be delayed if another, target GPU is busy with other tasks, resulting in an originating GPU (e.g., the GPU that needs the data) being starved for data while waiting for the target GPU to become available to fulfill the memory access request.

In some implementations, the DPU can determine forecasted demands and/or availability for a GPU. For example, the DPU can determine scheduling information about upcoming memory accesses and/or occupation activity on a GPU. In some cases, computations carried out on GPUs can be repetitive, for example for some machine learning tasks. In some implementations, memory operations can be predicted based on access patterns. For example, modern CPUs often prefetch (e.g., anticipate and retrieve data in advance to reduce wait times) a next portion of memory when fetching data from memory. For example, CPUs can perform sequential access, where prefetching can predict that if memory at address N is accessed, then memory at address N+1 will be needed soon and should be prefetched to reduce latency. Similarly, if a device fetches memory at address N and then at address N+M, a reasonable inference is that the next address to be accessed will be N+2M, where the memory accesses follow an interval pattern known as strided access. The DPU can determine if the memory access is strided or sequential. The example above describes strided access with regular strides (e.g., sequential memory accesses are spaced M addresses apart). However, it will be appreciated that other strides are possible. For example, spatial strides can be irregular but may nonetheless follow a discernable pattern. As another example, there may not be an obvious spatial stride, but access patterns may have a temporal component, in which a sequence of memory accesses repeats over time. Memory access patterns can be used to predict when a GPU will be available for memory operations (e.g., by predicting future memory accesses by the GPU) and/or for predicting which memory addresses a requesting GPU will need to access in the future. Such memory can be pre-fetched and fed to the requesting GPU as needed or can all be loaded into the requesting GPU's memory.

In some implementations, a DPU is configured to predict when the GPU will be done with an operation or set of operations (e.g., memory accesses, computations, etc.). In some implementations, the DPU is configured to forecast when the memory of a GPU is available for RDMA operations. As described herein in more detail, a DPU can determine, either via the CPU, via the GPU, or a combination of both, upcoming operations to be performed on a GPU. The DPU forecasting can be performed using a simple low-pass filter or simple average of past operation times. For example, if an operation of type X and size Y on GPU Z has historically taken time N to perform across one or more repetitions, the DPU can use N as an average time for forecasting when an operation will complete. As another example, a more sophisticated forecaster can be used. In some implementations, a Kalman filter is used. A Kalman filter uses a series of measurements observed over time and produces estimates. Kalman filters are widely used in time-series analysis, control systems, and the like. Operation of a Kalman filter can include a prediction and an update step. The prediction step can predict the next state (e.g., how long it will take for an operation to complete), and the update step can involve updating predictions based on the actual time for the operation to complete. The Kalman filter can refine its predictions over time by combining prior estimates with new measurements. This can be particularly powerful for scheduling tasks or memory accesses, where data from prior runs may be noisy, or systems may not be static over time (e.g., accelerators can be added, removed, upgraded, etc., or a system may otherwise undergo changes that affect performance). Other approaches can be used additionally or alternatively. Scheduling can be based on historical execution data, code analysis, etc.

During a kernel cycle (e.g., when certain operations are being executed on the GPU), a GPU may be compute-bound, rather than memory-bound, and thus RDMA operations can be performed. The duration of a kernel cycle can vary significantly depending on the algorithm being executed, typically ranging from milliseconds to seconds, e.g. from about 1 ms to several seconds.

In some implementations, a forecast can be determined over a limited time range, for example over a forward window of microseconds to milliseconds. In some implementations, the forecast can be based on instructions in a GPU pipeline, which can indicate what memory accesses are expected to occur within the forward window. In some implementations, memory access patterns can extend the forward window to seconds, minutes, or even longer.

There can be many DPUs and GPUs (or more generally, AUs) in a cluster. However, not all GPUs may need to access memory of all other GPUs in the cluster. For example, in a cluster of 1024 GPUs, a given GPU may only need to access memory from a small number of GPUs, such as 8, 16, 32, 64, etc. For example, different GPUs may have different data stored in their respective memories, and only some GPUs may have data that needs to be accessed by a particular GPU. In some implementations, a system can be configured to distribute the load among GPUs in the cluster to ensure that some GPUs are not overloaded while others are idle. For example, indexing or slotting algorithms can be used to distribute the load among GPUs in the cluster. The load can be distributed such that all GPUs are busy during load processing, but each GPU may not do the same amount of work or processing. If a subset of GPUs is more capable than another subset of GPUs within a cluster, the more capable set of GPUs can perform more tasks during the processing of the entire load, doing a larger share of the workload, in order to minimize the total load processing time.

In some cases, workloads can be uniform or approximately uniform, although scheduling may not be uniform. For example, in certain machine learning workloads, the distribution of need is fairly uniform, but scheduling is not necessarily uniform. In particular, while each GPU can be assigned a similar amount of data to process in certain workloads, the timing and order in which the tasks within an overall workload are executed can vary. Certain GPUs may start processing their assigned data earlier than other GPUs, or some computational tasks may require more computational resources, leading to variations in the scheduling. The varied scheduling can result in some GPUs finishing their tasks sooner and waiting for other GPUs to complete their tasks, which can impact overall efficiency. In some implementations, a scheduler is configured to minimize total processing time for a given set of operations and/or to minimize the amount of time individual GPUs are idle. In some cases, depending upon the task and hardware, it may be desirable to have some GPUs idle as utilizing such GPUs may cause the total execution time to be longer than if some GPUs are allowed to remain idle. For example, consider a hypothetical scenario in which GPU A is three times as fast at a task as GPU B. To minimize the overall computing time, it would be desirable to let GPU B remain idle while GPU A executes the entire task. Whether or not to utilize a particular GPU can depend upon various factors such as its performance relative to other GPUs, what efficiencies can be gained by splitting up a task across multiple GPUs, and so forth.

In some implementations, as a CPU dispatches kernels for execution, the CPU can analyze the kernel, predict memory access patterns, determine a range or ranges of memory spaces in the cluster that need to be accessed, and so forth. In some implementations, this information can be provided from the CPU to the DPU.

In some implementations, the DPU can receive scheduling information from the GPU itself. This can be advantageous because, for example, it can provide more fine-grained information. For example, during kernel execution, the GPU and communication information about what is taking place and is expected to take place on the GPU to the DPU.

In some implementations, the DPU can inform the GPU of anticipated latencies. In machine learning tasks, it can be relatively straightforward to predict RDMA operations, but this may not be the case in some other HPC applications, which can make it more difficult to forecast RDMA operations across the cluster. In some implementations, a GPU can complete some initial completions before reliable forecasting can be carried out. For example, after initial computations, memory ranges to be accessed can be known or predicted.

In some implementations, communication between the GPU and DPU may result in a shorter forward window, but the forward window may be determined with greater granularity.

In some embodiments, each DPU can determine a forecast for its associated GPU, and the DPUs can share (e.g., broadcast) the forecast with other DPUs in a cluster. The DPUs can then, based on the forecasts, determine overall forecasts that reflect the expected availability of relevant resources in the cluster. For example, if GPU 1 is expected to communicate with GPUs 2, 3, 4, and 5, but not GPUs 6-16, the DPU of node 1 can compute an overall forecast that only considers GPUs 1-5 and that does not include GPUs 6-12. In this simple example, the benefits (e.g., reduced processing time, reduced memory needs, etc.) associated with only considering involved GPUs may be largely insignificant. However, in a cluster where there may be thousands of GPUs, the savings from considering only the GPUs that are involved can be significant. For example, if a cluster contains 1024 GPUs but a GPU is only expected to perform RDMA operations with 63 other GPUs, the overall forecast for the GPU may only include 63/1024 (6.25%) of the total GPUs in the cluster. The benefits can be especially pronounced when forecasts are made over long forward windows, when greater detail is included in the forecasts, and so forth. As described herein, in some cases, a forecast may have a forward window of microseconds; thus, it is important to compute the forecast quickly so that it is not outdated before it can be used.

In some implementations, a DPU can use sidebands (e.g., communication channels to and from the DPU) to receive information from other DPUs, to receive information from a CPU, and/or to receive information from a GPU. A first sideband can be between the host processor (CPU) and the DPU. The CPU can dispatch jobs to the GPU via the sideband. As the CPU dispatches to the GPU (e.g., kernel launches), it can also provide forecasting information to the DPU about what the memory access patterns are expected to look like, for example based on the operations the GPU is expected to perform. In this context, the CPU runs software (e.g., a machine learning model) and launches a kernel on the GPU that instructs the GPU on what operations to perform and what memory spaces to access. This information can be shared from the CPU to the DPU. In this approach, a dispatcher operates on the CPU. However, in other implementations, the DPU can get such information directly from the GPU.

Sidebands are not part of the standard ROCE or RDMA operations. The sidebands can be separate logical interfaces. For example, some implementations can involve the DPU presenting a separate PCIe endpoint for sideband communication. Presenting a separate PCIe endpoint can enable other devices, such as GPUs and CPUs, to see and interact with this endpoint in a manner similar to or the same as a physical device. In some implementations, the DPU presents one or more virtual endpoints using PCIe Single Root I/O Virtualization (SR-IOV) technology.

In some implementations, communication between a GPU and a DPU can be bidirectional. For example, the GPU can inform the DPU of upcoming operations, memory accesses, and so forth, and the DPU can inform the GPU of expected latencies, delays, transmission times, and/or the like. Such information can be provided in response to a request or otherwise. For example, such information can be pushed from the DPU to a GPU or from a GPU to a DPU without there being a request issued for such information.

In some implementations, when a GPU scheduler dispatches RDMA operations (e.g., read or write to remote memory), the RDMA operations can be sent directly from the GPU to the DPU. The DPU can determine where to send the RDMA operation and can send the RDMA operation to the correct other DPU in the cluster. A receiving DPU can translate the memory addresses to a local address space of its associated GPU and can send read and/or write commands to the GPU as needed. Either or both of the transmitting DPU and the receiving DPU can have queues of requests from GPUs, queues of requests from DPUs, or both, and in some cases can have response data (e.g., output generated from processing tasks). In the context of machine learning, response data can include model-specific data, such as model weights. Internally, each DPU can be aware, for example via the sideband information received from a CPU, of which access will be needed and in what order. In some cases, the dispatches may have priorities associated therewith. A DPU can have sideband information received from some or all of the other DPUs in the cluster via a network sideband, such that the DPU is aware of the upcoming demands, availability, and other relevant information of other GPUs in the cluster. An originating DPU can, using the expected availability of other GPUs, the memory and/or processing capacity of its associated GPU, and so forth, reorder operations to reduce the likelihood that the associated GPU is starved (e.g., does not have data to use for carrying out operations). The decision for reordering operations can be made by evaluating the current availability of GPUs and the characteristics of the queued operations. For example, if a GPU with more memory becomes available and the next operation in the queue is small, but a subsequent operation requires more memory, the DPU can prioritize the larger operation for the newly available GPU. The dynamic reordering of operations can ensure that the most suitable GPU is utilized for each operation in order to improve overall performance and resource utilization.

The above description relates to an implementation in which the DPU receives sideband information from an associated CPU (e.g., a GPU in the same server as the DPU). However, as described herein, the sideband information may instead come from an associated GPU. In particular, the DPU can utilize direct sideband information from a GPU that is programmed to provide this information, similar to how the DPU would receive sideband information from a CPU. The flexibility (e.g., ability to receive sideband information from either the CPU or the GPU) can allow the DPU to adapt to different configurations and sources of information, ensuring efficient communication and operation within the system.

One advantage of an approach as described herein is that the DPUs can work together in a cooperative manner without the need for a central controller or authority. That is, each DPU has the forecast information it needs to make its own determinations about which GPUs to issue RDMA operations to, and when to do so. For example, each DPU can make a forecast of availability for its corresponding GPU available to other DPUs on the network, and other DPUs can access this forecast information as needed.

Example Implementations

FIG. 1 is a diagram that schematically illustrates the use of data processing units (DPUs) to enable GPU memory access across multiple GPUs and multiple servers on a network. In FIG. 1, servers 102-108 are connected to a network fabric 110. Each server contains eight GPUs and eight DPUs. Each GPU is connected to a corresponding DPU. For example, each GPU and DPU can be connected to the corresponding server (e.g., to a motherboard of the corresponding server via PCIe, and each GPU and its corresponding DPU can be connected to a same PCIe switch. Each DPU can include an ethernet port or other network interface port and can be connected with the other DPUs via the network fabric 110. It will be appreciated that there could more or fewer servers than are shown in FIG. 1. Servers can contain any number of GPUs and DPUs, limited only by the number of available PCIe or other suitable slots available within a server. Moreover, different servers may have different numbers or GPUs and DPUs.

Figure 2:
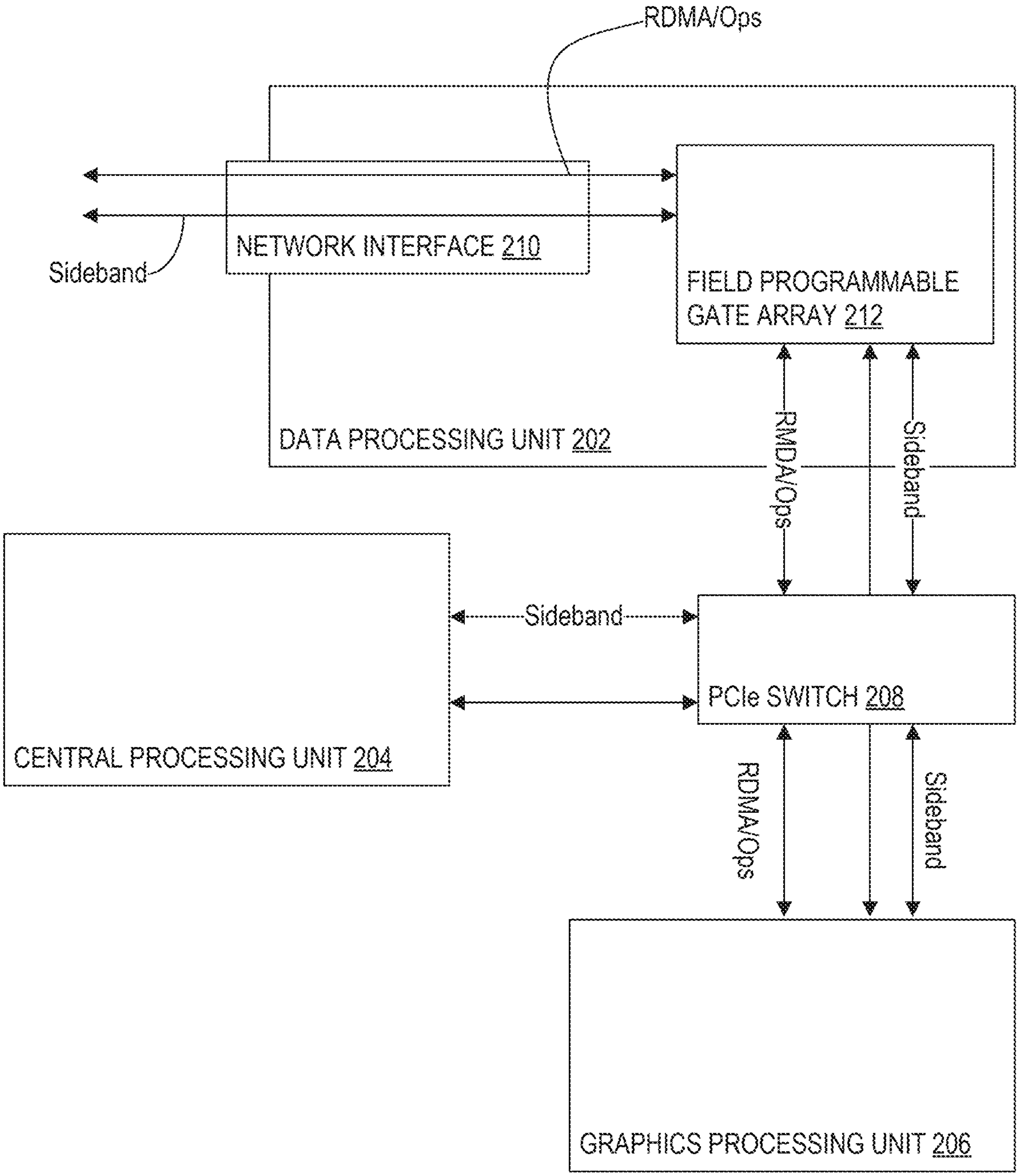
FIG. 2 is a diagram that schematically illustrates a data processing unit and associated hardware according to some embodiments.

FIG. 2 is a diagram that schematically illustrates a data processing unit 202 and associated hardware according to some embodiments. The data processing unit 202 can be in communication with a central processing united 204. The data processing unit 202 can be in communication with a graphics processing unit 206. Communication between the data processing unit 202 and the central processing unit 204 and/or between the data processing unit 202 and the graphics processing unit 204 can take place over a PCIe switch 208.

The data processing unit 202 can include a network interface 210 and a field programmable gate array (FPGA) 212. The network interface 210 can facilitate the flow of RDMA operations (and responses thereto) and can facilitate transmission and/or receipt of sideband information. The FPGA 212 can communicate with the CPU via a sideband, for example to obtain information about expected operations and memory access by the graphics processing unit. Additionally or alternatively, the FPGA 212 can communicate with the graphics processing unit 206 via a sideband to obtain and/or communicate information about availability, demand, and so forth with the GPU 206. The FPGA 212 can carry out RDMA operations in conjunction with the GPU 206. As discussed herein, it can be advantageous for the DPU 202 and the GPU 206 to be on the same PCIe switch 208. When the DPU and GPU are on the same PCIe switch, the data (e.g., RDMA operations, response data, sideband information, memory addresses, or control signals) is only one hop away, which can result in the minimum possible latency. However, if the DPU and GPU are not on the same PCIe switch, the communication between DPU and GPU can still occur without CPU intervention, but the data will be two or more hops away, leading to additional latency.

Figure 3:
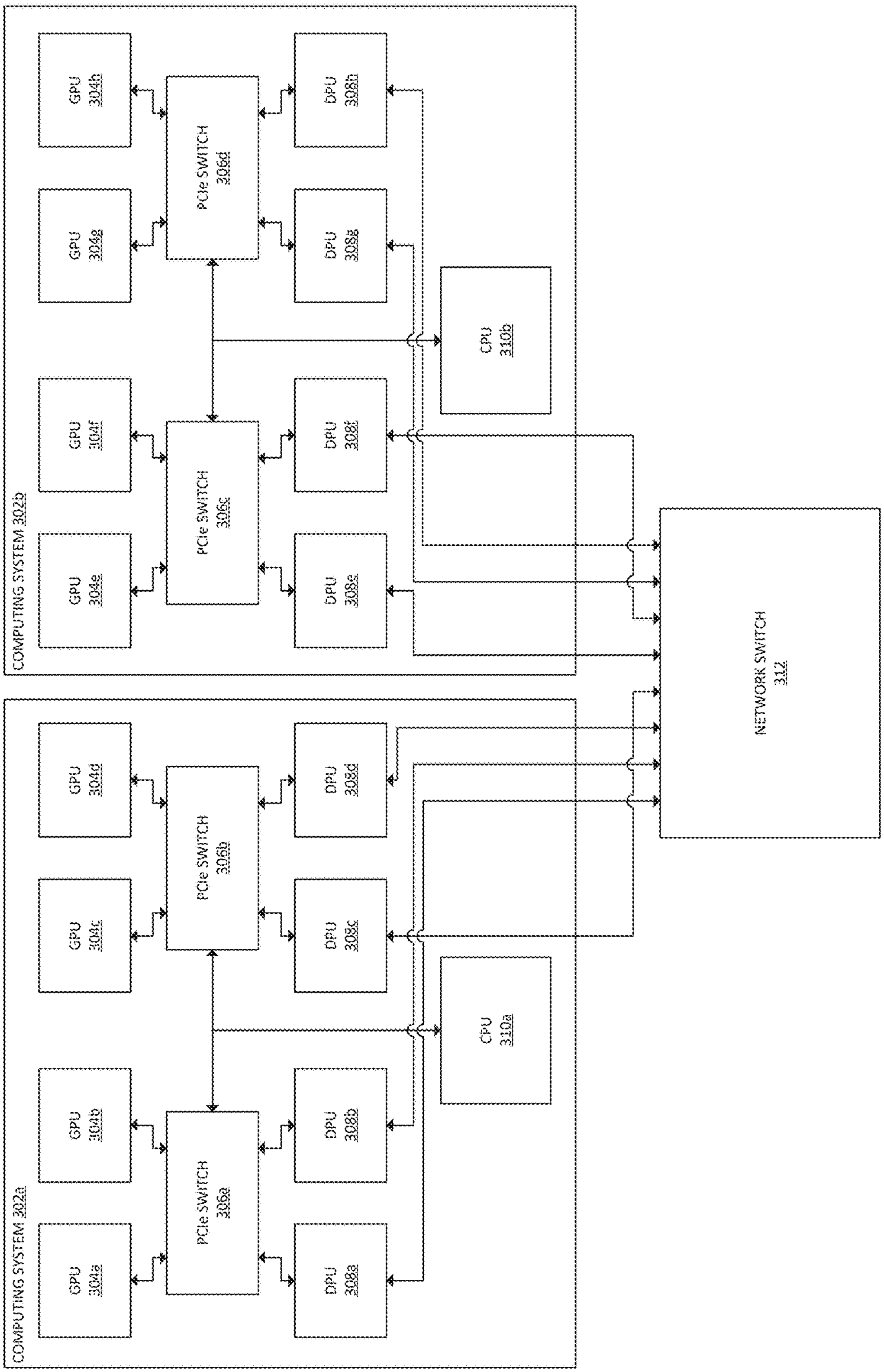
FIG. 3 is a diagram that illustrates an example configuration that utilizes DPUs for remote memory access according to some embodiments.

FIG. 3 is a diagram that illustrates an example configuration that utilizes DPUs for remote memory access according to some embodiments. In FIG. 3, two computing systems 302*a* and 302*b* are illustrated. Each computing system includes four GPUs (GPUs 304*a*-304*d* for computing system 302*a* and GPUs 304*e*-304*h* for computing system 302*b*, respectively) and four corresponding DPUs (DPUs 308*a*-308*d* for computing system 302*a* and DPUs 308*e*-308*h* for computing system 302*b*, respectively). The DPUs and GPUs are connected via PCIe switches 306*a-d* as shown in FIG. 3. Each computing system includes a CPU (CPU 310*a* for computing system 302*a* and CPU 310*b* for computing system 302*b*, respectively). The DPUs of each system are connected to a network switch 312. Memory can be remotely accessed by GPUs in different systems over the network, for example via the DPUs and the network switch.

Figure 4:
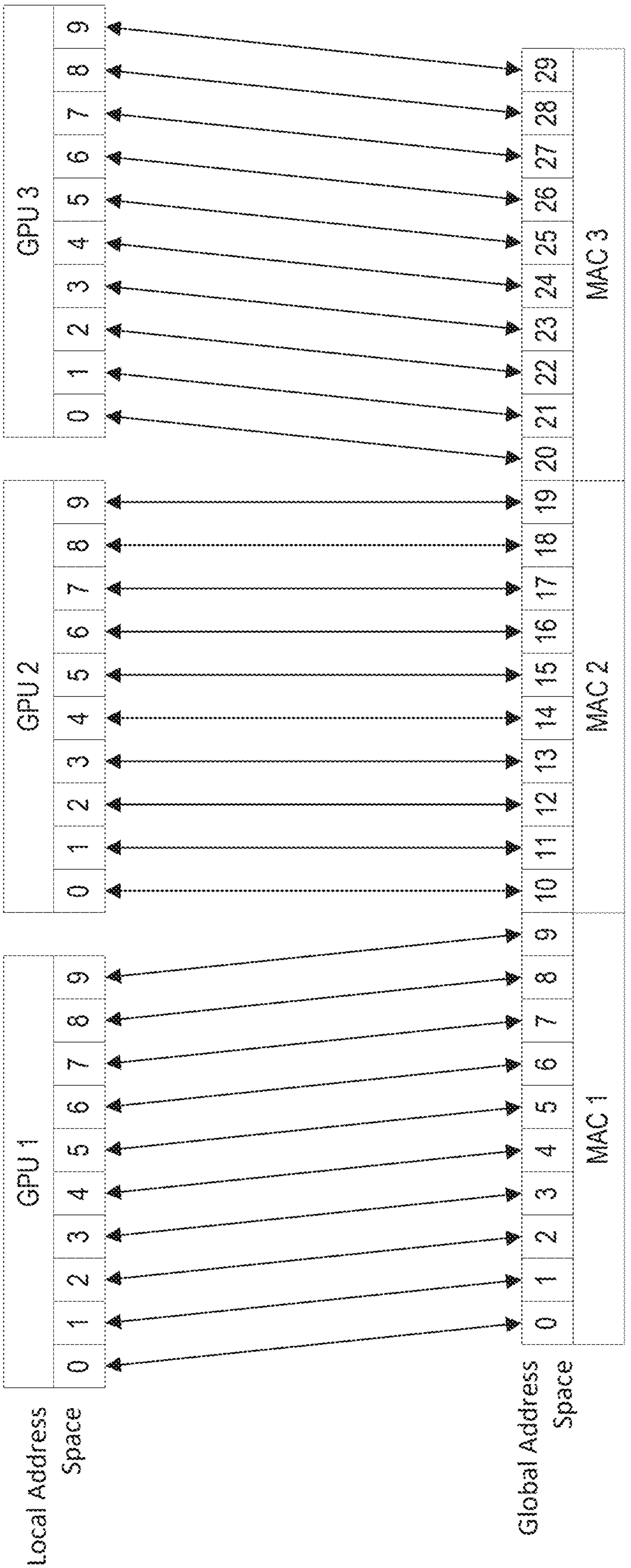
FIG. 4 is a diagram that illustrates memory mapping according to some implementations.

FIG. 4 is a diagram that illustrates memory mapping according to some implementations. It will be appreciated that FIG. 4 is for illustration only and does not necessarily represent how a memory mapping would appear in practice. For example, GPUs would typically include significantly more memory than is indicated in FIG. 4, and the number of GPUs can also be significantly greater than the number of GPUs illustrated in FIG. 4.

In FIG. 4, three GPUs are illustrated. Each GPU has a local address space associated with the GPU's memory. The local address spaces can be mapped to a global address space as shown in FIG. 4. Subsets of the global address space can be associated with MAC addresses. The MAC addresses can be MAC addresses of DPUs associated with the GPUs. For example, MAC 1 can be the MAC address associated with the DPU associated with GPU 1, and so forth. Each DPU can be configured to translate memory addresses from the global address space to the local address space of its associated GPU. In some implementations, each DPU can be aware of the global address space mapping to different DPUs. For example, a routing table may be used to determine that global address 13 is associated with a second MAC address corresponding to a second DPU, which may be associated with GPU 2.

Figure 5:
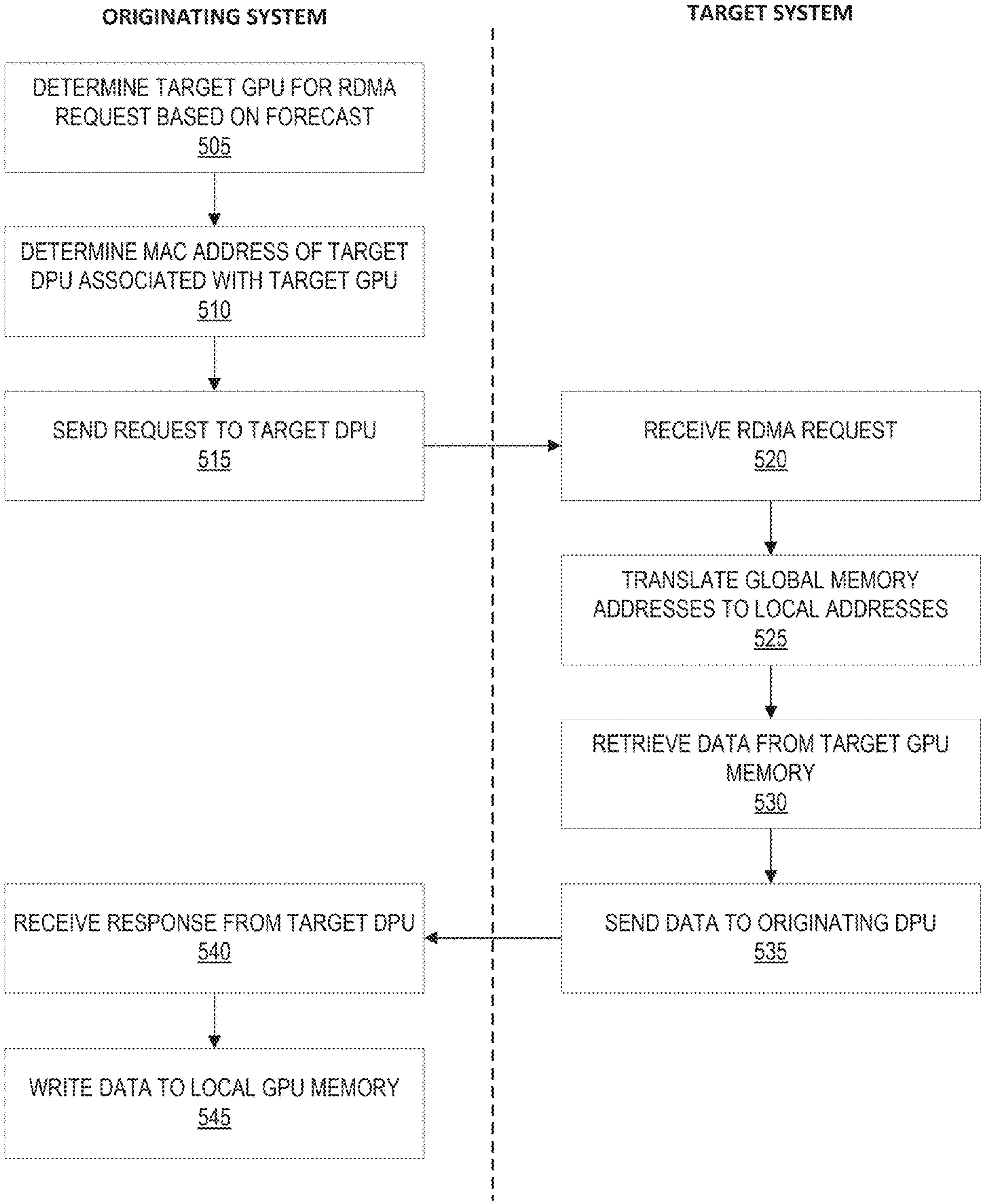
FIG. 5 is a block diagram that illustrates an example process for remote memory access according to some implementations.

FIG. 5 is a block diagram that illustrates an example process for remote memory access according to some implementations. At operation 505, an originating system can determine a target GPU for a remote direct memory access (RDMA) request, for example based at least in part on a forecast of availability for other GPUs in a cluster. At operation 510, the originating system can determine a MAC address of a target DPU associated with the target GPU. At operation 515, the originating system can send the remote direct memory access request to the target DPU. At operation 520, the target DPU can receive the RDMA request. At operation 525, the target DPU can translate global memory address to local memory addresses associated with the target GPU. At operation 530, the target system can retrieve data from the target GPU's memory. At operation 535, the target system can send the data to the originating DPU. At operation 540, the originating DPU can receive the response from the target DPU. At operation 545, the originating system can write the received data to local GPU memory.

In FIG. 5, the process illustrates requesting data from memory of a remote GPU. However, other exchanges are possible. For example, a request can be a read request or a write request.

Computer System

Figure 6:
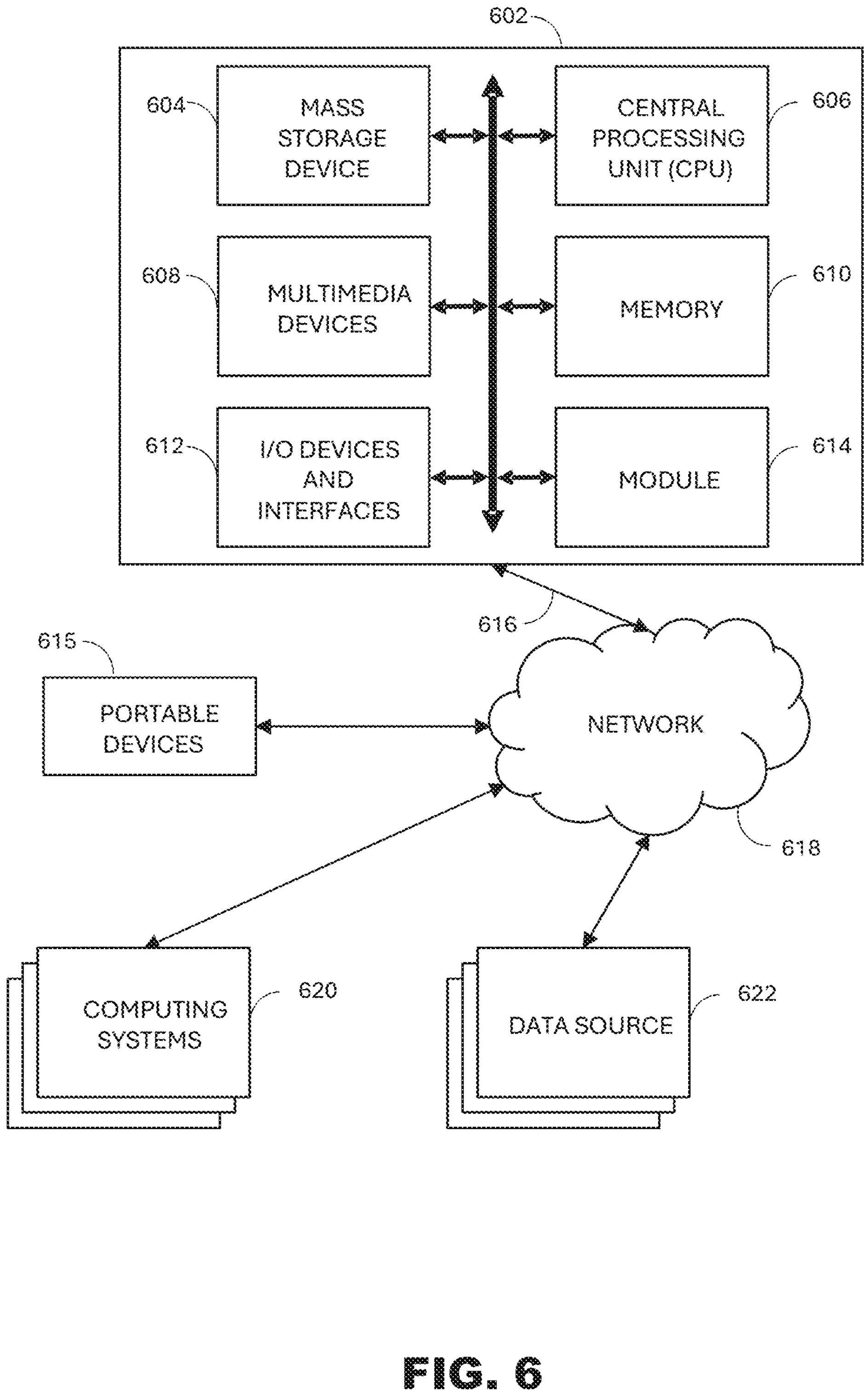
FIG. 6 is a block diagram depicting an embodiment of a computer hardware system configured to run software for implementing one or more of the systems and methods described herein.

FIG. 6 is a block diagram 600 depicting an embodiment of a computer hardware system 602 configured to run software for implementing one or more of the systems and methods described herein. The example computer system 602 is in communication with one or more computing systems 620 and/or one or more data sources 622 via one or more networks 618. While FIG. 6 illustrates an embodiment of a computing system 602, it is recognized that the functionality provided for in the components and modules of computer system 602 may be combined into fewer components and modules, or further separated into additional components and modules.

The computer system 602 can comprise a module 614 that carries out the functions, methods, acts, and/or processes described herein. The module 614 is executed on the computer system 602 by a central processing unit 606 discussed further below.

In general, the word "module," as used herein, refers to logic embodied in hardware or firmware or to a collection of software instructions, having entry and exit points. Modules are written in a program language, such as Java, C or C++, Python, or the like. Software modules may be compiled or linked into an executable program, installed in a dynamic link library, or may be written in an interpreted language such as BASIC, PERL, Lua, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 602 includes one or more processing units (CPU) 606, which may comprise a microprocessor. The computer system 602 further includes a physical memory 610, such as random-access memory (RAM) for temporary storage of information, a read only memory (ROM) for permanent storage of information, and a mass storage device 604, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 602 are connected to the computer using a standards-based bus system. The bus system can be implemented using various protocols, such as, for example and without limitation, Peripheral Component Interconnect (PCI), PCI Express (PCIe), Micro Channel, SCSI, Industrial Standard Architecture (ISA), and Extended ISA (EISA) architectures.

The computer system 602 includes one or more input/output (I/O) devices and interfaces 612, such as a keyboard, mouse, touch pad, and printer. The I/O devices and interfaces 612 can include one or more display devices, such as a monitor, which allows the visual presentation of data to a user. More particularly, a display device provides for the presentation of GUIs as application software data, and multi-media presentations, for example. The I/O devices and interfaces 612 can also provide a communications interface to various external devices. The computer system 602 may comprise one or more multi-media devices 608, such as speakers, video cards, graphics accelerators, and microphones, for example.

The computer system 602 may run on a variety of computing devices, such as a server, a Windows server, a Structure Query Language server, a Unix Server, a personal computer, a laptop computer, and so forth. In other embodiments, the computer system 602 may run on a cluster computer system, a mainframe computer system and/or other computing system suitable for controlling and/or communicating with large databases, performing high volume transaction processing, and generating reports from large databases. The computing system 602 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 602 illustrated in FIG. 6 is coupled to a network 618, such as a LAN, WAN, or the Internet via a communication link 616 (wired, wireless, or a combination thereof). Network 618 communicates with various computing devices and/or other electronic devices, such as portable devices 615. Network 618 is communicating with one or more computing systems 620 and one or more data sources 622. The module 614 may access or may be accessed by computing systems 620 and/or data sources 622 through a web-enabled user access point. Connections may be a direct physical connection, a virtual connection, and other connection type. The web-enabled user access point may comprise a browser module that uses text, graphics, audio, video, and other media to present data and to allow interaction with data via the network 618.

Access to the module 614 of the computer system 602 by computing systems 620 and/or by data sources 622 may be through a web-enabled user access point such as the computing systems' 620 or data source's 622 personal computer, cellular phone, smartphone, laptop, tablet computer, e-reader device, audio player, or another device capable of connecting to the network 618. Such a device may have a browser module that is implemented as a module that uses text, graphics, audio, video, and other media to present data and to allow interaction with data via the network 618.

The output module may be implemented as a combination of an all-points addressable display such as a cathode ray tube (CRT), a liquid crystal display (LCD), a plasma display, or other types and/or combinations of displays. The output module may be implemented to communicate with interfaces 612 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some implementations, the system 602 may comprise a physical or logical connection established between a remote microprocessor and a mainframe host computer for the express purpose of uploading, downloading, or viewing interactive data and databases on-line in real time. The remote microprocessor may be operated by an entity operating the computer system 602, including the client server systems or the main server system, an/or may be operated by one or more of the data sources 622 and/or one or more of the computing systems 620. In some implementations, terminal emulation software may be used on the microprocessor for participating in the micro-mainframe link.

In some implementations, computing systems 620 who are internal to an entity operating the computer system 602 may access the module 614 internally as an application or process run by the CPU 606.

In some implementations, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name, and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the creator. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 602 may include one or more internal and/or external data sources (for example, data sources 622). In some implementations, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 602 may also access one or more databases 622. The databases 622 may be stored in a database or data repository. The computer system 602 may access the one or more databases 622 through a network 618 or may directly access the database or data repository through I/O devices and interfaces 612. The data repository storing the one or more databases 622 may reside within the computer system 602.

CONCLUSION

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or operations. Thus, such conditional language is not generally intended to imply that features, elements and/or operations are in any way required for one or more embodiments or that one or more embodiments necessarily include logic for deciding, with or without author input or prompting, whether these features, elements and/or operations are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A system comprising:

a network switch;

a first computing system comprising:

a first central processing unit (CPU);

a first accelerator unit (AU) comprising a first AU memory;

a first data processing unit (DPU) comprising:

a first network interface configured to be communicatively coupled to the network switch; and a first programmable processing unit, wherein the first DPU is configured to present a first virtual endpoint configured for first sideband communication with at least one of the first CPU or the first AU, and wherein the first programmable processing unit is configured to generate a first forecast indicating availability of the first AU within a first forward window; and a first main board for receiving the first CPU, the first AU, and the first DPU, the first main board comprising a first bus interface configured to communicatively couple to the first AU and the first DPU;

a second computing system comprising:

a second CPU;

a second AU comprising a second AU memory; and a second DPU comprising:

a second network interface configured to be communicatively coupled to the network switch; and a second programmable processing unit, wherein the second DPU is configured to present a second virtual endpoint configured for second sideband communication with at least one of the second CPU or the second AU, and wherein the second programmable processing unit is configured to generate a second forecast indicating availability of second AU within a second forward window; and a second main board for receiving the second CPU, the second AU, and the second DPU, the second main board comprising a second bus interface configured to communicatively couple to the second AU and the second DPU, wherein the first DPU is configured to make the first forecast available via the first network interface to the second computing system, and wherein the second DPU is configured to make the second forecast available via the second network interface to the first computing system, wherein the first DPU and the second DPU are configured for transferring data between the first AU memory and the second AU memory.

2. The system of claim 1, wherein the first forecast is determined by:

accessing a set of instructions in an AU pipeline via the sideband, the set of instructions indicating operations to be executed by the first AU.

3. The system of claim 2, wherein the first forecast is further determined by:

determining a memory access pattern of the first AU, wherein the memory access pattern comprises one or more of: a sequential access pattern, a strided access pattern, or a temporally repeating access pattern.

4. The system of claim 1, wherein the first virtual endpoint is provided using PCIe Single Root I/O virtualization.

5. The system of claim 1, wherein the second DPU is configured to, in response to receiving a request from the first computing system for data stored in a memory of the second AU:

access one or more local memory addresses of the second AU memory; and transmit a content of the one or more local memory addresses of the second AU memory to the first DPU via the second network interface.

6. The system of claim 5, wherein the second DPU is configured to compress the content prior to transmitting the content to the first DPU.

7. The system of claim 5, wherein the request comprises one or more addresses in a global address space, the global address space comprising a mapping of the first AU memory and the second AU memory, wherein accessing the one or more local memory addresses of the second AU memory comprises:

determining, using the one or more addresses in the global address space and a mapping of the global address space to a local address space of the second AU memory, the one or more local memory addresses.

8. The system of claim 5, wherein the request is generated by the first DPU at least in part based on a determination of availability of the second AU by the first DPU based on the second forecast.

9. The system of claim 1, wherein the first AU is a first graphics processing unit (GPU) and the second AU is a second GPU.

10. The system of claim 1, wherein the first network interface is a first ethernet interface and the second network interface is a second ethernet interface.

11. The system of claim 1, wherein the first programmable processing unit comprises a first field programmable gate array (FPGA) and the second programmable processing unit comprises a second FPGA.

12. The system of claim 1, wherein the first bus interface is a first PCI express (PCIe) interface and the second bus interface is a second PCIe interface, and wherein the first DPU and the first AU are connected to a first PCI switch.

13. A method for remote direct memory access in a cluster of systems comprising a plurality of accelerator units (AUs) and a plurality of data processing units (DPUs), wherein each DPU of the plurality of DPUs is associated with an AU of the plurality of AUs, the method comprising:

accessing, by a requesting data processing unit (DPU) of the plurality of DPUs associated with a requesting AU of the plurality of AUs, a plurality of forecasts, each forecast of the plurality of forecasts corresponding an AU of the plurality of AUs, wherein each DPU of the plurality of DPUs is configured to generate a forecast for its associated AU;

determining, by the requesting DPU using at least a subset of the plurality of forecasts, a target AU selected from the plurality of AUs;

generating, by the requesting DPU, a request for data stored in a memory of the target AU;

transmitting, by the requesting DPU, the request to a target DPU associated with the target AU;

receiving, by the requesting DPU from the target DPU, the data; and causing writing of the data to a memory of the requesting AU.

14. The method of claim 13, wherein the plurality of forecasts is generated by, for each DPU and its associated AU:

accessing, by the DPU, a set of instructions in an AU pipeline of the associated AU, the set of instructions indicating operations to be executed by the associated AU.

15. The method of claim 14, wherein each forecast of the plurality of forecasts is further determined by, for each DPU and its associated AU:

determining, by the DPU, a memory access pattern of the associated AU, wherein the memory access pattern comprises one or more of: a sequential access pattern, a strided access pattern, or a temporally repeating access pattern.

16. The method of claim 13, wherein the target DPU is configured to compress the data prior to transmitting the data to the requesting DPU, the method further comprising, prior to causing writing of the data to the memory of the requesting AU:

decompressing, by the requesting DPU, the compressed data.

17. The method of claim 13, wherein the target DPU is configured to, in response to receiving the request from the requesting DPU for data stored in a memory of the target AU:

access one or more local memory addresses of the target AU memory; and transmit a content of the one or more local memory addresses of the target AU memory to the requesting DPU via a network interface of the target DPU.

18. The method of claim 17, wherein the request comprises one or more addresses in a global address space, the global address space comprising a mapping of memory in each AU of the plurality of AUs, wherein accessing one or more memory addresses of the target AU memory comprises:

determining, using the one or more addresses in the global address space and a mapping of the global address space to a local address space of the target AU, the one or more local memory addresses.

19. The method of claim 13, wherein each programmable processing unit of the plurality of DPUs comprises a field programmable gate array.

20. The method of claim 13 wherein each DPU and its associated AU are connected to each other via a same PCI express (PCIe) switch.

* * * * *